United States Patent Office 2,759,488
Patented Aug. 21, 1956

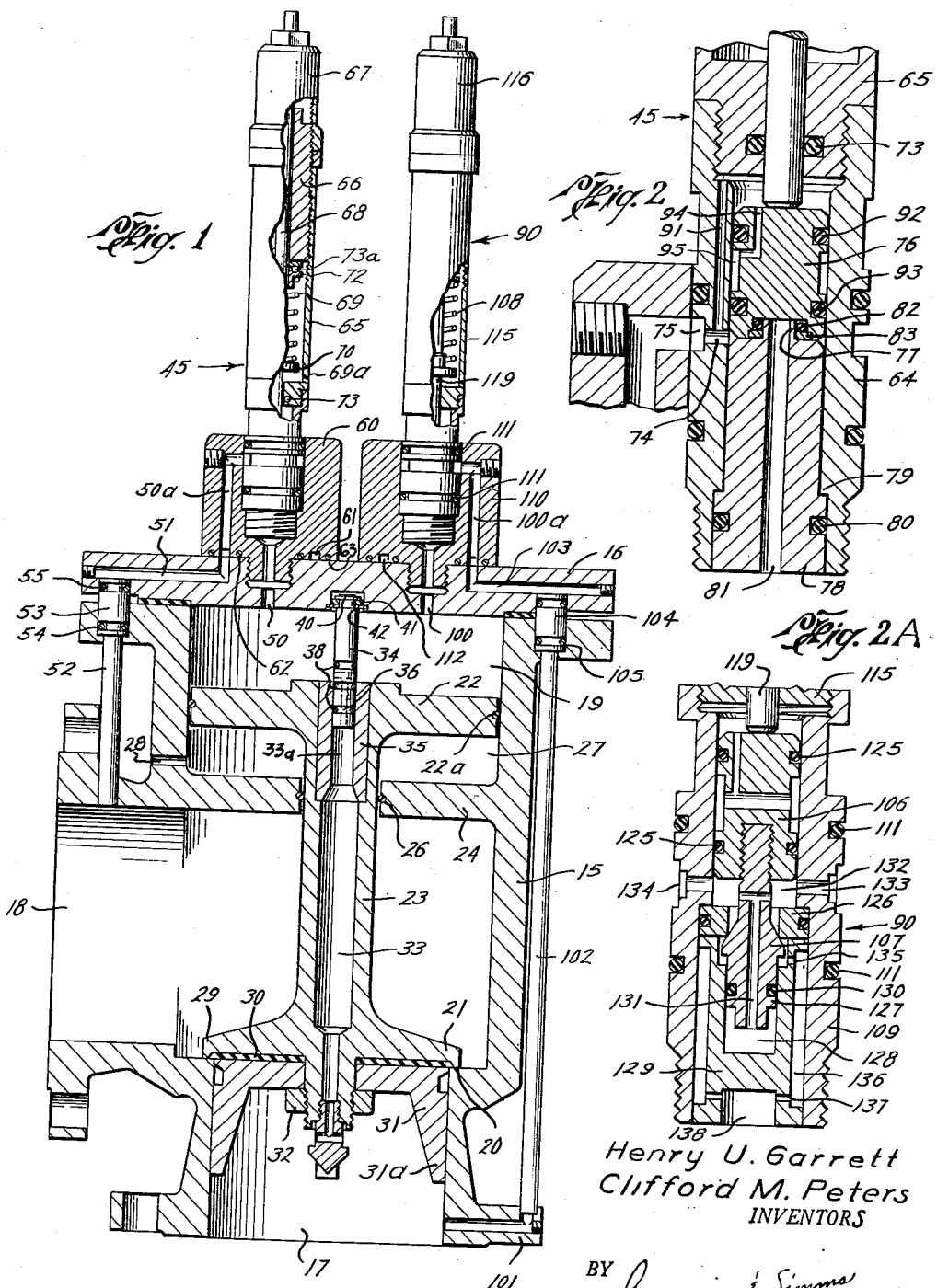

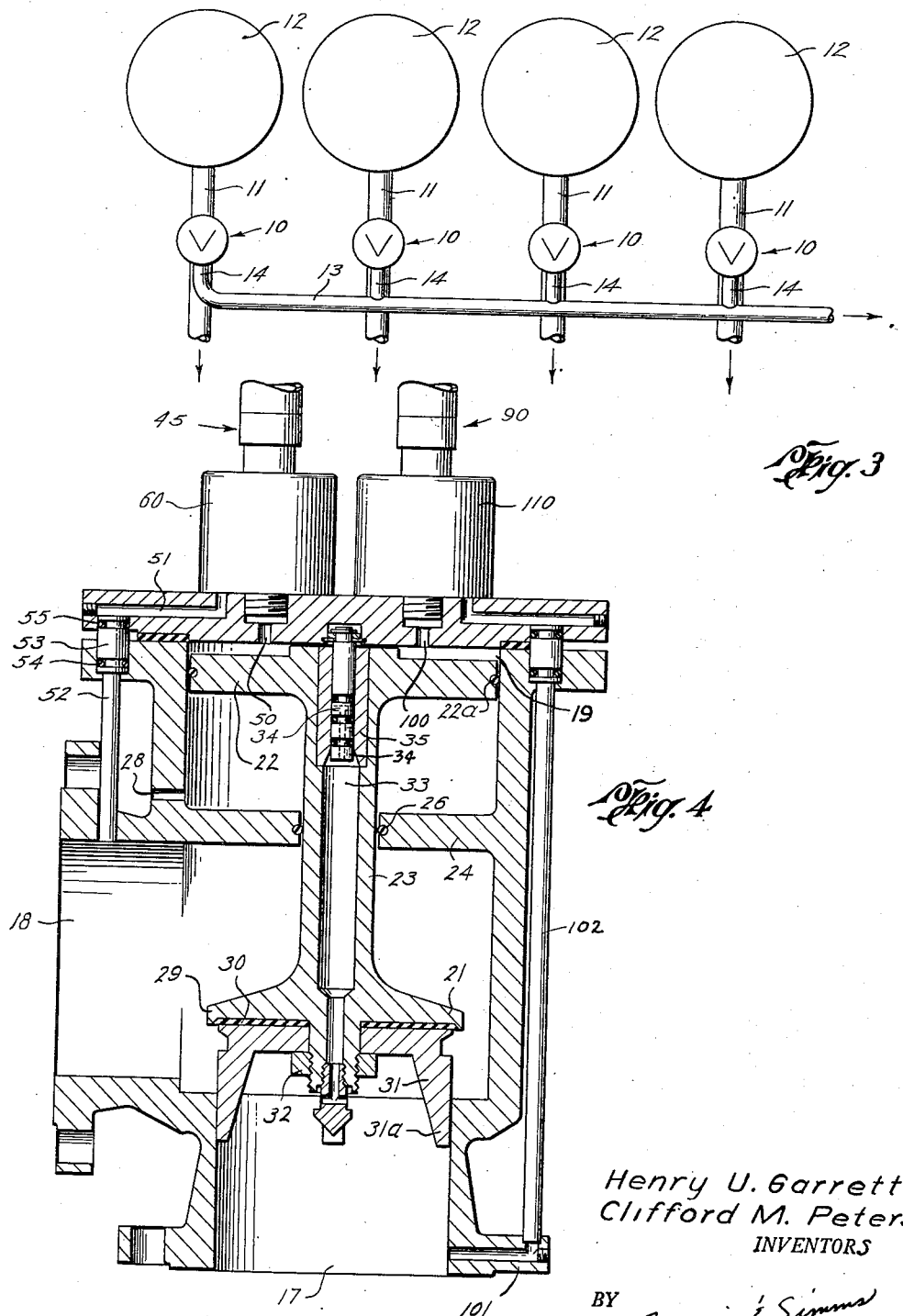

2,759,488

RELIEF VALVE

Henry U. Garrett and Clifford M. Peters, Houston, Tex., assignors to Garrett Oil Tools, Inc., Houston, Tex., a corporation of Texas Application June 16, 1951, Serial No. 231,944

3 Claims. (Cl. 137—491)

This invention relates to improvements in pressure relief valves and refers more particularly to that class of pressure relief valves of the differential piston type.

This invention is an improvement of the pressure responsive valve of our copending applications for United States Letters Patents, Serial Number 74,875, filed February 7, 1949 (now Patent No. 2,552,892, issued May 15, 1951), and Serial Number 164,872, filed May 29, 1950 (now Patent No. 2,619,109, issued November 25, 1952).

It is common practice throughout industry, particularly in petroleum industry, to vent a plurality of pressure relief valves into a common discharge line or header in order to conduct any discharged relief fluid from the vicinity of the valves. In many instances the common discharge line is quite long, leading to a flare or the like, so that when one of the relief valves discharges fluid thereinto, there is exerted a considerable back pressure on the other relief valves.

When the relief valves of such systems are of the differential piston type, that is those valves wherein the seating member if urged into seated position by application of the fluid pressure from the system being protected to a piston connected thereto, the piston having a greater effective pressure area than that of the seating member, a back pressure will be effective against the piston on the opposite side thereof from the fluid pressure of the system being protected. Should the back pressure on a valve exceed that of the system being protected, the valve will be opened even though the pressure in the system is below the set pressure of the relief valve. For example, when a system being protected by a relief valve is bled down to atmospheric pressure, it is now necessary to blind off the relief valve in order to prevent it from being opened by the back pressure of another valve discharging into a common header. Obviously, the same disadvantage is inherent in other types of relief systems wherein a back pressure is produced by any means whatsoever.

It is an object of this invention to provide a relief valve of this general class which will remain seated irrespective of a back pressure applied thereto.

Another object of this invention is to provide a valve of this general class with means for preventing a back pressure from unseating the same.

Another object of this invention is to provide a valve of this general class in which means are provided for preventing a back pressure from acting against the piston in opposition to the pressure of the system protected.

Yet another object of this invention is to provide a differential piston type relief valve wherein there is provided a constant pressure chamber on the side of the piston opposite from that exposed to the pressure in the system being protected whereby a back pressure applied to the valve is ineffective in causing it to open.

Other objects, advantages, and features of this invention will be apparent to one skilled in the art upon consideration of the written specification, the appended claims and the attached drawings; wherein:

Fig. 1 is a partial cross-sectional view of an illustrative embodiment of the relief valve of this invention;

Fig. 2 is a cross-sectional view of the pilot means for relieving the control pressure within the main valve;

Fig. 2A is a cross-sectional view of the pilot valve for repressuring the main valve;

Fig. 3 illustrates one application of the valve of this invention; and

Fig. 4 is a cross-sectional view of the valve of Fig. 1 except that the valve element is shown in an open position.

In the drawings, like characters of reference are used throughout the several views to designate like parts.

Referring to Fig. 3 of the drawings, the reference numeral 10 designates the relief valve of this invention which can be connected to a conduit or pipe line 11 of the pressure system being protected. Such conduit can be the discharge line from an individual tank of a battery of the same or the discharge line from compressors or any other system whose pressure is to be protected. Relief valves 10 can be connected to a common discharge header 13 by means of conduit stubs 14 so that the fluid relieved from the systems 12 can be conveyed through conduit 13 to a point remote therefrom, such as to a flare or the like.

Referring now to Fig. 1, the relief valve comprises a casing 15 and a bonnet 16. The casing is provided with an inlet or pressure relief port 17 which can be connected to the system to be protected by means of a flange connection, and with an outlet port 18 adapted to be attached to a common discharge header such as conduit 13 by means of a suitable flange connection.

The interior of casing 15 includes a chamber 19 which is preferably cylindrical and in axial alignment with relief port 17.

A seat 20 is provided for relief port 17 and is adapted to receive valve member 21 which engages the seat and is urged therefrom by the pressure within the system whose pressure is to be controlled.

A pressure means including a pressure responsive member is provided in the casing and is adapted to urge the valve member to a seated position when the pressure in the system protected is below a predetermined value. Such means can comprise a piston 22 residing within the casing and separating chamber 19 from the relief port and outlet port. Piston 22 has a sealing means 22a forming a sliding seal with the walls of chamber 19 and is adapted to reciprocate therein toward and away from seat 20. A power transmitting connection 23 is provided to connect the piston to the valve member. In the interest of simplicity it is preferred to form the piston and valve member as integral units.

In accordance with one aspect of this invention, there is provided a constant pressure chamber open to the side of the pressure responsive member opposite from that against which the pressure from the system to be controlled acts. This constant pressure chamber ensures that the pressure actuating the pressure responsive member will not be partially canceled in effect by any back pressure applied to the valve. A suitable means for providing this chamber can comprise an inwardly extending shoulder or flange 24 joined at its periphery to casing 15 and extending inwardly to have a central opening therein through which power transmitting connection 23 passes in slidable relationship.

A sliding seal between flange 24 and connection 23 can be provided by an O-ring 26 so as to prevent the passage of fluid from one side of flange 24 to the other. Thus, since piston 22 is likewise provided with a sliding seal, there will be provided between piston 22 and flange 24 a constant pressure chamber 27 which can be opened to the atmosphere through passage 28 or to any other constant pressure source.

Valve member 21 can be constructed by having a flange 29 extending outwardly from connection 23 and adapted to overlie and abut against the shoulder of seat 20. Disposed in a recess on the side of flange 29 closest to the inlet port 17 is a sealing means 30, preferably of rubber, which abuts against seat 20 to form a fluid tight seal therewith when the valve member is in seated position. The sealing means can be held in place by a spider guide 31 having downwardly extending guide arms 31a sliding along the inner walls of inlet port 17 to guide the valve member into proper position. A nut 32 is provided to hold guide 31 in position.

The cylinder 19 and piston 22 have larger diameters and effective pressure areas than those of seat 20 and valve member 21. Thus, it will be apparent that when pressure within chamber 19 is equal to that within the system protected, the resultant force due to pressure acting against the piston and valve member will hold the valve member in a seated position.

A bleed means is provided for supplying pressure fluid from the system protected to chamber 19 when the valve member is seated. This means can include a central passage 33 through the valve member-piston unit. Means is provided to close this passage when the valve member is in open position, that is, when the pressure in chamber 19 has been relieved sufficiently to permit piston 22 to move towards the bonnet as illustrated in Fig. 4. The closing means is illustrated as including an element or bolt 34 depending from bonnet 16 into the discharge end of passage 33a which is a continuation of passage 33 contained within bushing 35. This bolt has a central passage 36 of a susbtantially smaller cross-sectional flow area than passage 33 so that it acts as a constriction or choke. It has laterally extending end ports opening into chamber 19. Seal means, as for example, O-rings 38, are provided for sealing between bolt 34 and passage 33a on both sides of the lateral end ports, when the piston-valve unit is in its Fig. 4 or open position.

The upper end of bushing 35 can be tapered to have walls diverging toward the piston end of the unit so that O-rings 38 can be easily received within passage 33a to form a seal.

Bolt 34 is suspended from bonnet 16 by a shoulder 40 formed thereon and reecived in a counterbore in the bonnet. A washer 41 is placed around bolt 34 and the entire assembly held in place by a split ring 43 situated in a groove in the bonnet.

It is believed to be obvious from the foregoing that when the valve member is seated, as shown in Fig. 1, passages 33, 33a, and 36 will establish a communication between the interior of chamber 19 and the pressure system protected so that such pressure can be exerted over the effective pressure area of piston 22 to urge the valve member to a seated position. However, when the valve member is in an open position, as shown in Fig. 4, bolt 34 will be pushed into passage 33a so that the lateral ports from passage 35 and their adjacent seal rings will prevent flow of fluid to chamber 19. It is to be noted that the capacity of passage 36 is so small that the fluid from the system protected slowly bleeds into chamber 19.

In order to unbalance the forces due to pressure acting on piston 22 and valve member 21 upon occurrence of a predetermined maximum pressure within the system protected to thereby open the relief valve, a high pressure pilot relief means, designated generally by the numeral 45, is provided for relieving the pressure within chamber 19. This pilot means is of a self-closing snap-action type and preferably is of such type as will remain open for a definite time period sufficient to provide relief of the pressure within chamber 19.

Although a particular pilot relief valve means has been developed for this purpose and is preferred, it is to be understood that other relief valves of this general class can be employed with reasonably satisfactory results.

The preferred pilot valve controls the relief port 50 in the bonnet. The capacity of relief port 50 is much greater than that of passage 36 whereby the pressure within chamber 19 is quickly vented when port 50 is opened. Port 50 has a portion 50a that communicates with a passage 51 in the bonnet. While the latter passage can open out into the atmosphere, it is ordinarily preferred to pass the fluid relieved from chamber 19 into the conduit leading from the main relief valve. To do so, there is provided a conduit 52 opening out into discharge port 18 and having its other end opening into passage 51. The end of conduit 52 adjacent the bonnet has an enlarged portion 53 bearing seal rings 54 and 55 in sealed relationship with the casing and the bonnet, respectively.

The pilot valve resides in an enlarged portion of port 50 formed in coupling nut 60 which is threadedly attached to bonnet 16. In order to provide proper communication between passages 50a and 51, there is provided in the face of coupling nut next to the bonnet an annular passage 61 sealed on each side by annular seal rings 62 and 63. In this manner passage 50a will always be in communication with passage 51 irrespective of the rotational position of coupling nut 60.

The pilot valve includes a fitting 64 threaded into coupling nut 60. This fitting carries at its upper end a housing 65 with an adjusting screw nut 66 threadedly received therein. A cap 67 can be provided over the top of the housing to protect the same and has one end inwardly threaded to act as a stop nut for adjusting screw nut 66. A valve stem 68 extends through nut 66 and is pressed downwardly by control spring 69 which engages guide 70 formed on the valve stem. The other end of spring 69 bears against a thrust bearing abutting one end of nut 66 and comprising a spring retaining ring 72 which forms one of the races for bearing 73a. In this manner nut 66 can be screwed into and out of housing 65 to adjust the tension of spring 69 without applying any substantial rotative stress thereto. The lower end of stem 68 passes through a reduced diameter opening in the lower end of housing 65 and is sealed therefrom by suitable sliding seal such as O-ring 73 residing in a peripheral groove formed in the housing. A passage 69a vents the housing above O-ring 73 to the atmosphere.

Fitting 64 has a laterally extending opening 74 providing a passage between the interior of the fitting and passage 50a via peripheral groove 75. Flow through passage 74 is controlled by a relief valve piston 76 seating on a seat formed by boss 77 on the end of the seat member 78. The latter is maintained in a fixed position in the fitting by a shoulder 79 bearing thereagainst. An O-ring seal 80 is provided between the seat member and the fitting. Extending through the seat member is a passage 81 which discharges centrally of boss 77. Disposed around the boss is O-ring 82 maintained in place by a washer 83 carried by piston 76. With such construction, an effective seal is provided between passage 81 and piston 76, when the latter is seated on the boss, to prevent fluid escaping from the passage.

This arrangement is such that the pressure within chamber 19 acts through passage 81 to urge piston 76 from its seat on the boss. The tension of spring 69 acts against such pressure through valve stem 68 and such tension is adjustable by nut 66 to a magnitude that when a predetermined pressure exists in the system protected and in chamber 19, piston 76 will be forced upwardly to remove it from its seat on member 78. Since passage 36 in bolt 34 has a much greater flow capacity than passage 36 in bolt 34, the unseating of piston 76 will cause the pressure in chamber 19 to rapidly decrease so that piston 22 is urged toward the bonnet by the pressure in the system protected acting against valve member 21. It is to be noted that when piston 76 has been cracked from its seat the entire cross-sectional area thereof will then be exposed to the pressure of the fluid from passage 81 causing the piston to snap quickly away from member 78. When valve member 21 has been unseated and piston 22 pushed towards bonnet 16, bleed passages 33 and 36 are closed by bolt 34 being pushed into bushing 35 so that the end ports of passage 36 are sealed. As a result the pressure within chamber 19 will not build up again so that the relief valve will remain open until the pressure within such chamber is built up by a supplementary means. Such means can comprise a low pressure pilot valve shown generally as numeral 90.

It is a feature of the pilot valve shown in Fig. 2 that any back pressure acting through passage 50a against the lower end of piston 76 is prevented from aiding the fluid pressure within chamber 19 in unseating the piston from its seat to thereby open the relief valve at a pressure below its set pressure. Provision against such contingency is effected by providing a means for applying any back pressure in passage 50a to the other side of the piston 76. Thus, passage 91 is provided to connect with the upper end of piston 76 so that the back pressure will exert substantially no net force tending to move the piston and will not cause an opening thereof by acting solely on the lower face of the piston. In a preferred embodiment, the net effective pressure area contained within sealing means 73 disposed around the valve stem is made substantially equal to the net effective pressure area contained within seating means 82 disposed around boss 77 so that although the effective pressure area of the upper end of piston 76 may be larger than that of its lower end due to boss 77, this difference will be canceled out by the back pressure acting to decrease the force of spring 69 by an amount equivalent to that which could have been applied by the back pressure over the area contained within sealing means 82.

In order to aid the sealing effectiveness of O-rings 92 and 93 contained on piston 76, there is provided a passage 94 communicating with a peripheral groove 95 between the O-rings and the upper end of the piston so that any pressure which may accumulate between the O-rings will be bled off.

The low pressure pilot valve 90 controls a passage 100 in valve bonnet 16 which in turn may communicate with the pressure to be controlled at any desirable point as, for instance, by fitting 101, conduit 102, and passage 103. Conduit 102 can have an enlargement 104 provided with seal rings 105 to effect a communication between passage 103 and the conduit.

The low pressure pilot means includes generally a spring pressed plunger piston 106, a valve element 107 and an adjustable spring biased valve stem and housing therefor of similar structure and function as the corresponding parts of pilot valve 45, with the single exception that it is not necessary to provide a seal 73 around the valve stem.

Piston 106 is exposed to the pressure from passage 103 so that the force of the pressure acting against the piston opposes that of spring 108. Thus, when the pressure within passage 103, which it will be remembered is the pressure within the system protected, falls below a predetermined value, spring 108 will move piston 106 downwardly to unseat valve member 107.

The detail construction of the low pressure pilot means includes a fitting 109 threadedly received in a bushing nut 110 and sealed thereto by means of O-rings 111 disposed on each side of portion 100a of passage 100. Bushing nut 110 has an annular passage 112 in the face thereof adjacent to the valve bonnet which is sealed on either side by O-rings. In this manner, communication between passage 100a and passage 103 is assured irrespective of the rotational position of bushing nut 110.

Fitting 109 has a housing 115 threaded thereto, which has an adjustable compression nut locked in an adjusted position by a cap 116 in a manner similar to that described for valve 45.

Piston 106 is engaged by valve stem 119 and has a slidable seal such as O-rings 125 with an interior bore of the fitting. Valve member 107 is dependent from piston 106 and seats against an inwardly extending shoulder member 126 which is borne by fitting 109.

In order to balance out the effect of the pressure of the fluid in the system being protected on the area enclosed within the seated valve member 107 so that such pressure can effectively act solely on the pressure area of piston 106, there is provided a piston or plunger 127 forming an extension of valve member 107 on its end downstream of its seat and reciprocally received in a corresponding cylindrical portion 128 of member 129 and maintained in sealed relationship therewith by a sealing element such as O-ring seal 130. The effective pressure area of plunger 127 is preferably made equal to the effective pressure of valve element 107 across its seat with shoulder 126.

Communicating with cylinder 128 is a passage 131 having laterally extending ports opening into the pressure fluid chamber 132. Also communicating with this chamber is a restricted flow passage 133 between such chamber and an annular groove 134 which opens out onto passage 100a. In this manner, the force exerted by the pressure fluid in chamber 132 on the valve element 107 over the effective pressure area of its seat is counterbalanced by a fluid under the same pressure acting through passage 131 against plunger 127 so that the pressure of the fluid in the system protected does not have any net actuating force on valve element 107 across its seat.

Member 129 is provided with a fluid passage 135 downstream of the seat of valve member 107 and this passage in turn communicates by an annular passage 136, passage 137, and bore 138 with passage 100 into chamber 19.

Passage 137 is provided as a restricted flow area to permit manual testing of the relief valve. Thus, when the system being protected is temporarily at a pressure below that at which a low pressure valve is set to open and it is desired to test the relief valve to determine whether it is operating properly, valve stem 68 of the high pressure pilot valve can be lifted manually to permit the pressure in chamber 19 to be vented in order to unseat valve member 21 from its seat 20. With restricted passage 137, the repressuring fluid from passage 103 cannot flow into chamber 19 at a rate sufficiently high to prevent piston 22 from rising therein. Hence the operation of the relief valve can be satisfactorily tested even though the pressure in the system being protected is below the set pressure of the low pressure pilot valve.

Operation of this low pressure pilot means is believed apparent. With valve element 107 seated, the pressure from the system protected is active against the area of piston 106 thereby urging it upwardly against spring 108. It is to be noted that the pressure acting against the valve member over the area seated within shoulder 126 is effectively counter-balanced by the same pressure acting in an opposite direction against the end of plunger 127 which is of equal area of that contained in the valve seat. Therefore, the seating and unseating of valve element 107 is independent of the pressure existing in the chamber 19 and hence in the chamber below the valve seat. When the force due to the pressure acting against the end of piston 106 falls below that of spring 108, the spring forces piston 106 downwardly to unseat the valve element. Plunger 127 is still exposed to the same pressure as exists in chamber 132 so that the unseating of the valve element does not disturb the balance of forces due to unseating of the valve. When the pressure within the pressure system protected rises above a predetermined value, valve element 107 will be reseated.

It is believed that the operation of the various parts of the relief valve of this invention is apparent from the foregoing description, however, a brief description of the operation of the relief valve as a whole will be given to ensure a complete disclosure of the invention.

The relief valve can be mounted upon any pressure system to be protected and is particularly adapted to be mounted to discharge with one or more other relief valves into a common discharge header without having the back pressure affected by opening of the other relief valves causing irregularities in the operation of the instant valve. When so mounted the pressure of the system protected is active against the area of valve member 21 which is enclosed within seat 20 to urge the valve member towards an unseated position. However, this same pressure bleeds through passages 33 and 36 into chamber 19 and is active against the relatively larger area of piston 22 in a direction to seat valve member 21.

As long as the pressure within the system protected is below the selected safe maximum, the relief valve member 21 will remain closed. However, when this pressure exceeds the selected maximum, the high pressure pilot valve 45 is opened and quickly effects a reduction in the pressure within chamber 19 so that the pressure acting against the valve member 21 causes the valve member to rise against the forces acting against piston 22 in the opposing direction. When the valve member is in open position, the bleed port opening from passage 36 is closed so that the pressure within chamber 19 remains relieved until the pressure within the system protected falls below a predetermined lower limit. When this occurs the low pressure pilot valve 90 is opened to supply pressure to chamber 19. This pressure fluid is substantially the same as that acting against valve member 21 to hold it open and, being effective across a greater area than the area of valve member 21, the valve member is forced to closed position. As soon as the pressure within the system protected builds up above the lower limit, low pressure pilot valve 90 will close. It will be appreciated, however, that any time the pressure within the system protected falls below the predetermined lower limit so that the pilot valve 90 opens, this will not have any effect upon the relief valve 21 but that it will remain closed.

When a back pressure is applied through outlet port 18 to the relief valve of this invention, the latter will not be opened when such back pressure exceeds pressure of the system being protected because flange 24 prevents its access to piston 22. Thus, when a plurality of relief valves are connected to a plurality of pressure systems to be protected as shown in Fig. 3, relief of pressure from any one of the systems will not cause the relief valve of any of the other systems which may have a set pressure lower than the back pressure effected by such relief valve, to open. For example, if the system protected comprises compressors and one of the compressors is shut down so that the pressure throughout the relief valve protecting that system falls to atmospheric pressure, the opening of one or more of the other relief valves operating on systems which have not been shut down will not cause the relief valve of the system which has been shut down to fly into an open position due to back pressure applied thereto. Specifically, if the valve shown in Fig. 1 is mounted on a system whose pressure is substantially atmospheric and a pressure be applied through outlet port 18, such pressure will be prevented from acting against the lower side of piston 22 by inwardly extending flange 24 and the pressure on the lower side of piston 22 will remain atmospheric, irrespective of the magnitude of the pressure exerted through outlet port 18, due to venting of chamber 27 through port 28. Hence it is believed to be apparent that a back pressure applied to the valve will not cause it to open but will, on the contrary, act to urge valve member 21 even more firmly into its seat 20.

With the construction of the relief valve of this invention similar to that illustrated in the drawings, it is believed to be apparent that the valve is particularly adapted to be used in systems having a very close set relief and closing pressures. Thus, when the valve of this invention is employed to protect a pipe line having a safe maximum pressure limit of 700 p. s. i. it can be set to open at 690 p. s. i. and to close at 680 p. s. i. thereby providing a very narrow operating range with resultant economies in operation. The advantage of this close set operation will be even more apparent when it is remembered that many other types of relief valves must be set to open at a pressure which is substantially below, say 30 to 50 p. s. i. in the example given above, the safe maximum pressure of the line in order to assure that the line will be adequately protected. Thus, the operating pressure of a line, when using the instant valves, may be as much as 40 p. s. i. above that permissible with other types of relief valves and still afford the same degree of protection.

Another advantage of the valve of this invention is that there is no necessity for permitting escape of fluids across the main valve seat into a so-called "huddling" chamber as in many other types of valves in order to effect an operation thereof. Accordingly, there is no opportunity for such gases or fluids to erode the seat of the valve by their constant passage therethrough.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

This invention having been described, what is claimed is:

1. In a system to be protected which includes a plurality of conduits connected with a common header, a relief valve in each conduit for venting the fluid in said conduit into the header, each of said relief valves comprising, a valve body having an inlet connecting with a conduit and an outlet connecting with the common a header with a passage between the inlet and outlet, a seat in the passage for controlling flow to and from the outlet, a valve member controlling the seat and mounted to be urged by inlet pressure in an unseating direction and by outlet pressure in a seating direction, a pressure actuator for the valve member and carried by the body, said actuator including means providing a pressure responsive member of larger effective area than that of the valve member within said seat and having a power transmitting connection with the valve member, so that the pressure responsive and valve members move together as a unit, restriction means for supplying fluid under pressure from said inlet to one side of the pressure responsive member to oppose movement of the valve member in an unseating direction, means shielding the opposite side of said pressure responsive member from the valve inlet, outlet and passage, and exposing it to atmosphere so that upon the pressure from an inlet of one relief valve in said system being decreased to atmospheric and another relief valve in said system opening to relieve pressure into said header, the resultant back pressure on the valve member of said one relief valve urges is to its seat and is prevented from acting upon the larger area of said opposite side of said pressure responsive member, and means responsive to the pressure on the pressure side of the pressure responsive member for relieving the last mentioned pressure.

2. A pressure responsive valve which comprises, in combination, a valve casing having an inlet and an outlet port, a valve member therebetween to seat against pressure from said inlet port, a piston of larger effective pressure area than said valve member disposed in said casing to form therewith a pressure chamber on one side of said piston, power transmitting connection means between said piston and said valve member, means for bleeding pressure fluid to be controlled into said pressure chamber, a snap action high pressure pilot means for relieving pressure from said pressure chamber upon occurrence of a predetermined maximum pressure in the system protected by said valve; said pilot means including a body providing a cylinder, a first conduit connecting between the pressure chamber and an end of the cylinder and having a seat about its connection with said cylinder, a second conduit connecting between the cylinder and the outlet port of the valve casing, a piston movable within the cylinder between a position in which a pressure responsive face thereof is seated upon the first conduit seat to close the same and another position in which said face is spaced from the seat to communicate said first and second conduits, means urging the piston to said seated position but responsive to a predetermined pressure within the pressure chamber and acting upon the portion of said pressure responsive face within said seat to permit said face to be unseated, the connection of said second conduit with the cylinder being located to communicate said second conduit with the piston face exteriorly of that portion within the seat; and conduit means in said body connecting the second conduit with the pressure responsive face of the piston opposite to the first-mentioned face, a flange extending inwardly of said casing to seal off from said outlet port the side of said piston opposite said pressure chamber to form a chamber between said flange and said opposite side of the piston, and means venting said last-mentioned chamber.

3. A valve of the character defined in claim 2, wherein the piston urging means includes an actuator sealably received through an opening from the end of the cylinder opposite the seat, and the effective pressure area across said opening is substantially equal to that contained within the seat.

References Cited in the file of this patent
UNITED STATES PATENTS

| | | |
|---|---|---|
| 134,435 | Mayer | Dec. 31, 1872 |
| 135,437 | Mayer | Feb. 4, 1873 |
| 919,300 | Anderson | Apr. 27, 1909 |
| 1,229,726 | Ebling | June 12, 1917 |
| 1,611,079 | Roschanek | Dec. 14, 1926 |
| 1,627,628 | Anderson | May 10, 1927 |
| 1,805,702 | Mastenbrook | May 19, 1931 |
| 2,500,888 | Wilhelm | Mar. 14, 1950 |
| 2,574,414 | Ragland | Nov. 6, 1951 |
| 2,576,541 | Schmitt | Nov. 27, 1951 |
| 2,619,109 | Garrett | Nov. 25, 1952 |